United States Patent [19]

Ghiron et al.

[11] 3,717,850

[45] Feb. 20, 1973

[54] PROGRAMMED DATA PROCESSING WITH FACILITATED TRANSFERS

[75] Inventors: Hugo Ghiron, Chatham; Werner Ulrich, Colts Neck, both of N.J.

[73] Assignee: Bell Telephone Laboratories, Incorporated, New York, N.Y.

[22] Filed: March 17, 1972

[21] Appl. No.: 235,603

Related U.S. Application Data

[63] Continuation of Ser. No. 543,756, April 19, 1966, which is a continuation of Ser. No. 244,396, Dec. 13, 1962, abandoned.

[52] U.S. Cl. ........................................ 340/172.5
[51] Int. Cl. ........................................ G06f 7/00
[58] Field of Search ........................................ 340/172.5

[56] References Cited

UNITED STATES PATENTS

| | | | |
|---|---|---|---|
| 2,777,635 | 1/1957 | Tootill et al. | 340/172.5 |
| 3,058,658 | 10/1962 | Schmierer et al. | 340/172.5 |
| 3,260,997 | 7/1966 | Arndt et al. | 340/172.5 |

*Primary Examiner*—Raulfe B. Zache
*Attorney*—R. J. Guenther

[57] ABSTRACT

An overlap mode computer is disclosed in which delays in making transfers are minimized by placing the transfer instruction in a position in the subset of instructions prior to the last position. The position of the transfer instruction is selected such that its execution in the overlapped sequence of executions is completed immediately after the accessing of the last instruction of the subset transferred from.

12 Claims, 2 Drawing Figures

PROGRAMMED DATA PROCESSING WITH FACILITATED TRANSFERS

Figure 1A:
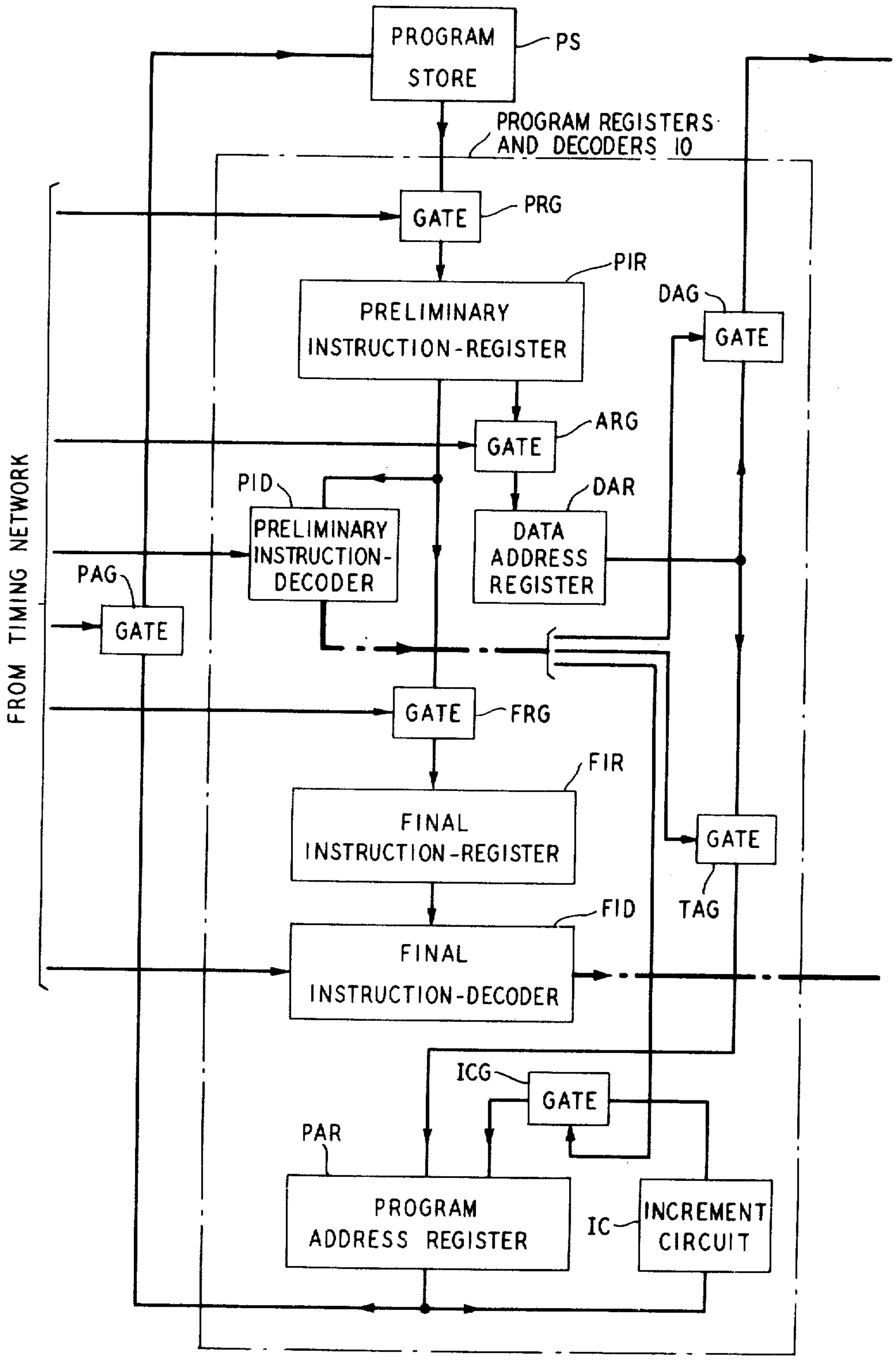

This is a continuation of application Ser. No. 543,756 filed Apr. 19, 1966, which is itself a continuation application Ser. No. 244,396 filed Dec. 13, 1962, now abandoned.

This invention relates to the processing of data by program, and more particularly to the facilitation of transfers dictated by the program.

A program is a set of instructions for carrying out preassigned operations on data by the use of processing equipment. To make the data available as required, they are converted into a form that is compatible with the equipment and, during processing, are variously entered into, and extracted from, a temporary memory known as a data store. To make the instructions readily available, they are also converted into a form that is compatible with the processing equipment and they are placed beforehand in a memory known as a program store.

Associated with each instruction is an address giving its location in the program store. When taken together, an instruction and its address constitute a step of the program. Typically, the addresses are assigned sequentially to the steps of the program. This does not mean, however, that the executed instructions have sequential program store locations. Rather, the processing inevitably requires operations with varying degrees of recurrence. For example, the various steps of a program used to direct the operation of multiplying one number by another may be called upon frequently during processing. To save storage, the instructions associated with recurrent operations generally have a single subset, or subroutine, of entries in the program store. Whenever the program proceeds to a point where another subset is required, a transfer is made to it. This is accomplished by the inclusion, with each subset, of a special instruction, called a transfer, which contains the location in the program store of the first instruction in a new subset.

Since a transfer typically interrupts the instructional sequence of a program, the time required for executing it may be greater than that required for an ordinary instruction. Where transfers are frequent in a program, the cumulative effect of the added operating time can represent a significant portion of the over-all processing time.

Accordingly, it is an object of the invention to reduce the over-all processing time required in the execution of a program. A specific object is to do so by reducing the time required to execute a transfer.

Transfers require additional operating time where data processing takes place on an overlap basis. There, the noninterfering portions of various program steps are carried out simultaneously. As has been noted, one such portion of a program step is the address giving the location of an instruction in the program store. In addition, the instruction itself contains subordinate portions, typically a command portion specifying an operation to be performed and an address portion giving the location in storage of data concerned with the operation.

Thus, any step of a program may contain portions which cannot be acted upon simultaneously. For example, the execution of the command portion of an instruction cannot take place until the instruction has been obtained by "addressing" the program store and the data store has been subsequently "addressed" to determine the storage position from which, or into which, data will be either "read" or "written" in accordance with the instruction.

However, for a group of program steps there are noninterfering portions that can be made to overlap, i.e., the addressing of the program store for one instruction can take place while the data store is being addressed for another instruction and the command is being applied to still another instruction. As a result, in overlap operation the over-all processing can take place in considerably less time than would be the case if the various operations associated with a program step had to be carried out in sequence before the corresponding operations associated with an ensuing program step.

On the other hand, an overlap system poses complications if the last instruction of a particular subset has been executed and a transfer is to be made to another subset. Before the transfer can be accomplished, additional instructions, which overlap the transfer, but which are unnecessary because of the transfer, have to be blocked to prevent them from being carried out. Besides the equipment complexity that attends the blocking of unwanted instructions, there is an associated waste of overlap operation time during the interval that the processing equipment must concern itself with unwanted, rather than the wanted, instructions.

Consequently, it is an object of the invention to facilitate the achievement of transfers in a data processing system operating on an overlap basis. A related object is to eliminate the need for blocking unwanted instructions during a transfer interval. Another object is to carry out the transfers without undue time delay.

In accomplishing the foregoing and related objects, the invention provides a method by which a transfer from one set of data processing instructions to another is executed before the terminal instruction of the subset from which the transfer is being made. The preliminary step of the method entails executing some, but not all, of the instructions forming a subset, followed by the steps of transferring to an instruction of another subset and executing the remaining instructions of the original subset. The method is partly carried out by a program in which a transfer instruction is included before the terminal instruction of a subset of instructions being executed on an overlap basis. The specific location of the transfer instruction in the program depends upon the delay ordinarily encountered between the time of addressing the transfer instruction and the time of addressing the first, or transferee, instruction of a new subset of instructions. With instructions that are carried out but once for each step, or cycle, of the program and are subject to a delay of N cycles between the addressing of the transfer and transferee instructions, the transfer instruction is inserted N−1 instructions before the last instruction of the subset.

It is a feature of the invention that an intermediate transfer instruction not only reduces the number of operating cycles required before a transfer can be carried out, but it also eliminates the need for blocking unwanted instructions.

Figure 1B:
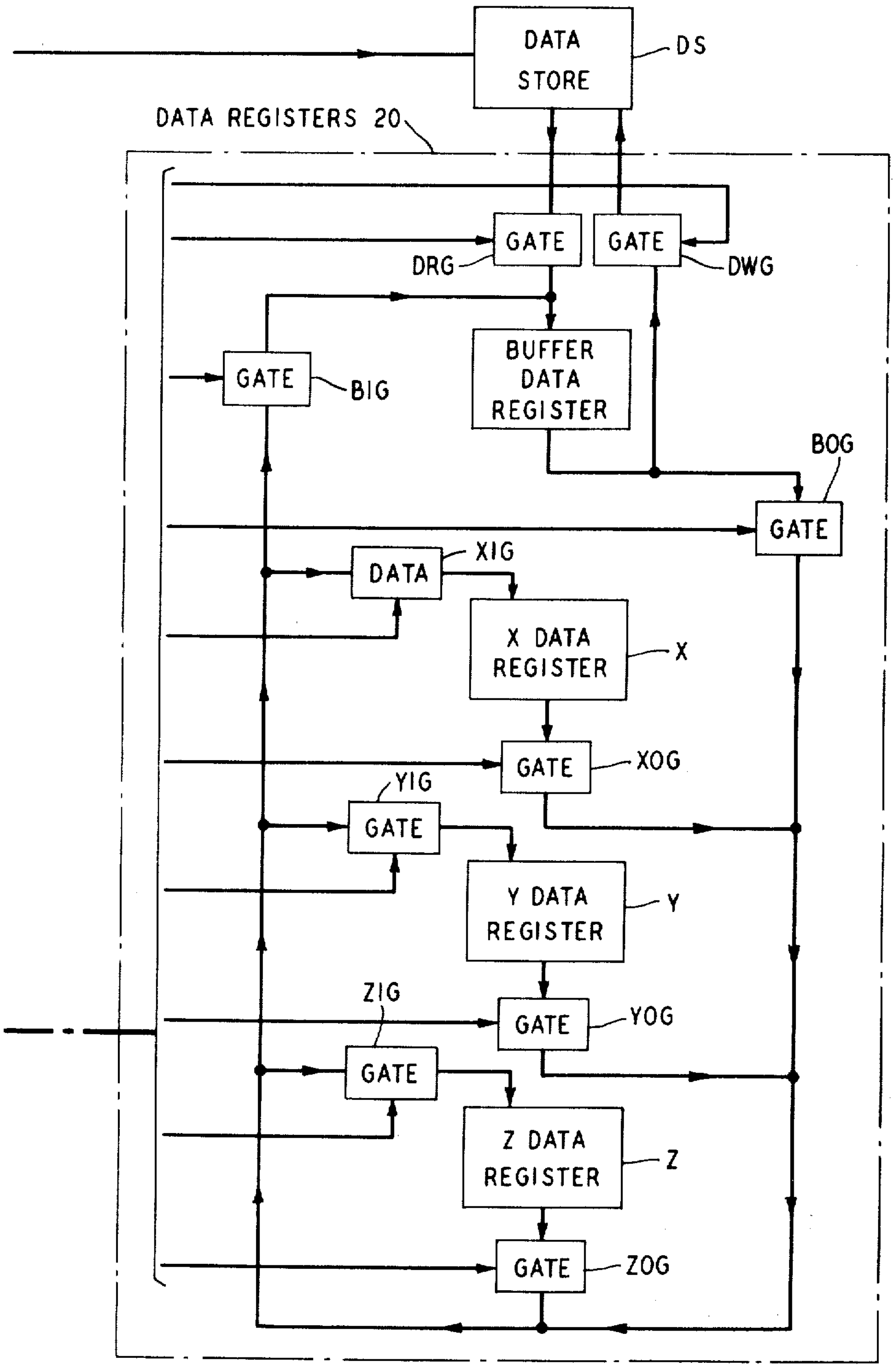

Other aspects of the invention will become apparent after considering an illustrative embodiment taken in conjunction with FIGS. 1A and 1B, which are block diagrams of a data processing system.

As shown in FIGS. 1A and 1B, a Program Store PS, operating through a group 10 of Registers and Decoders, serves as a source of instructions which are executed by a group 20 of Data Registers, acting in conjunction with a Data Store DS. For simplicity the Data and Program Stores are indicated as separate units, but the same unit, for example, a magnetic core matrix of well-known construction may be used for both. The Data Store DS and Program Store PS may, for example, comprise magnetic core storage units such as those shown in block form in FIG. 138a of J. L. Brown U.S. Pat. No. 3,036,773, granted May 29, 1962, and shown in greater detail in FIGS. 139 through 148 of the Brown patent. In addition, the various constituent gates, registers, and decoders of FIGS. 1A and 1B are of standard design. The gates are operated for brief and selective intervals of each machine cycle from a conventional synchronous timing network (not shown). Such a machine cycle is commenced with a common synchronizing pulse, following which enablement pulses of short duration appear at the various gates according to a preassigned schedule. Signals are transmitted through the gates only during the enablement intervals; otherwise the gates are closed.

Before an instruction can be executed, it must be taken out of storage. This is done by a Program Address Register PAR whose coded output gives the location of the instruction in the Program Store PS. The Program Address Register PAR might comprise an instruction register such as that shown as counter 1.24 in FIG. 1 of the above-noted Brown U.S. Pat. No. 3,036,773, and as shown in greater detail in FIGS. 2*v* and 17 of that patent. One machine cycle after the code signals, forming the address, are gated in parallel through a Program Address Gate PAG to the Program Store, the associated instruction passes through a Preliminary Register Gate PRG into a Preliminary Instruction-Register PIR. The Preliminary Instruction Register PIR might comprise an instruction register such as instruction register 1.20 in FIG. 1 of the above-noted Brown U.S. Pat. No. 3,036,773, and as shown in greater detail in FIG. 2*h* and FIGS. 13*a* through 13*e* of that patent. Both the Program and Data Stores include conventional circuitry by which their addressing signals are held until each addressing operation is completed. The instruction that passes into the Preliminary Register has two parts — a prefix portion containing the coded command of the instruction and a suffix portion typically containing the coded address of the data in the Data Store. The former is decoded by a Preliminary Instruction-Decoder PID; the latter enters a Data Address Register DAR through an Address Register Gate shortly after the instruction enters the Preliminary Instruction Register PIR. Both the Preliminary Decoder PID and the Address Register Gate ARG are operated by the timing network. The Preliminary Instruction Decoder PID might comprise an operation decoder such as the secondary operation decoder shown in FIGS. 5*a* and 5*b* of the above-noted Brown U.S. Pat. No. 3,036,773.

Subsequently, within the same cycle, the Preliminary Decoder PID can make the data address in the Data Address Register DAR available to the Data Store by operating a Data Address Gate DAG. The Data Address Register DAR might comprise an address register such as address register 1.22 shown in FIG. 1 of the above-noted Brown patent, and shown in greater detail in FIGS. 16*a* and 16*b* of that patent. The data address gives the location or destination in the Data Store of the data to be acted upon in accordance with the dictates of the instruction. The latter i.e., instruction, is transferred in the interim to a Final Instruction-Register FIR through a Final Register Gate FRG. The Final Instruction Register FIR might comprise an instruction register such as instruction register 1.20 shown in FIG. 17 of the above-noted Brown patent, and as shown in greater detail in FIG. 2*h* and FIGS. 13*a* through 13*e* of that patent.

To complete the carrying out of a step of a program, a Final Instruction-Decoder translates the instruction of the Final Instruction-Register. The latter operates various Gates associated with the Data Registers (FIG. 1B). One Register, the Buffer Data Register BDR, serves as a buffer for the Data Store and three others, X, Y and Z register data arriving from the Data Store or destined for it. The final Instruction Decoder FID might comprise an operation decoder such as the secondary operation decoder shown in FIGS. 5*a* and 5*b* of the above-noted Brown patent. The specific operation of the Gates is determined by whether the instruction dictates that the data be dispatched from the Data Store to one of the Data Registers or vice versa.

When the data are sent to the Data Store, i.e., "written" in it, the Final Decoder operates a Data Writing Gate DWG and a Buffer Register Input Gate BIG, along with one of the output gates XOG, YOG, or ZOG, according to the instruction being executed. Conversely, when data are "read" from the Data Store the Final Decoder operates a Data Reading Gate DRG and a Buffer Register Output Gate BOG, along with one of the input gates XIG, YIG, or ZIG, according to the instruction. The various input, output and other gates might comprise combinations of diode logic AND gates such as that shown in FIG. 2*k* of J. A. Haddad et al. U.S. Pat. No. 2,974,866, granted Mar. 14, 1961.

In summary of the gating operations during a machine cycle, the Gates PRG and PAG, together with Gates DRG and DWG, are operated approximately synchronously with the beginning of the cycle. Shortly after the cycle begins, Gate ARG is enabled, at about the same time as Gate BOG and one of the Input Gates XIG, YIG or ZIG. The enablement of Gate ARG is followed shortly by the enablements of Gates DAG and FRG, accompanied by the enablement of either Gate TAG or Gate ICG according to whether or not a transfer is to take place. Some time after the enablement of Gate ARG, but before the enablement of Gate PRG of the ensuing cycle, there are enablements of Gate BIG and one of the Output Gates XOG, YOG or ZOG.

Because of the foregoing gating sequence, coupled with the delay characteristic of the Program Store, one instruction is being decoded from the Preliminary Instruction-Register while the next instruction is being read in the Program Store. Shortly before the instruction being read is delivered to the Preliminary Instruction-Register, the instruction being decoded is sent to the Final Instruction-Register.

Under ordinary circumstances, where the steps of the program follow in sequence, each succeeding address at the output of the Program Address Register PAR is obtained by augmenting its predecessor by unity through the operation of a standard Increment Circuit IC (FIG. 1A). The Increment Circuit IC might comprise an advancing circuit such as the Advance Instruction Counter circuit shown in FIG. 107 of the above-noted U.S. Pat. No. 3,036,773 to J. L. Brown. However, when a transfer is to take place, the address indicated by the Program Address Register must be modified to accord with the location in the Program Store of the first instruction to which a transfer is to be made. This modification is carried out through the use of a transfer instruction whose suffix portion does not refer to a location in the Data Store, but rather to a transfer location in the Program Store. When a conventional transfer instruction enters the Preliminary Register, a sequencing circuit (not shown) of conventional design is necessary for blocking the Decoders associated with the Preliminary and Final Registers until the Preliminary Register contains the transferee instruction, i.e., first instruction of the subset to which a transfer is being made. At the same time the sequencing circuit, when used, gates the transfer address through a Transfer Address Gate to the Program Address Register where the pre-existing address is either replaced or modified.

However, when a transfer is to be made in accordance with the invention, a sequencing circuit is unnecessary and there is no blocking of instructions entering the Preliminary and Final Registers. Because blocking of the Registers is not required, the use of a special transfer instruction in the manner provided by the invention results in the early accomplishment of a transfer and an attendant reduction in the time required for processing data.

As noted earlier the special transfer instruction occupies an intermediate position in a subset of instructions included in a program for carrying out preassigned operations with the processing system shown in FIGS. 1A and B.

A representative program, modified in accordance with the invention, is given in the table.

TABLE: Data Processing Program

| Step of Program | Step of Subset | Address of Instruction | Data Processing Instruction Prefix or Command | Suffix or Data Address |
|---|---|---|---|---|
| 1 | 1-A | 300,000 | MX | 14,000 |
| 2 | 2-A | 300,001 | MY | 14,001 |
| 3 | 3-A | 300,002 | XM | 14,002 |
| 4 | | 300,003 | ENT | 315,000 |
| 5 | 4-A | 300,004 | YM | 14,003 |
| 6 | | 300,005 | MZ | 14,004 |
| | 1-T | 315,000 | MZ | 14,005 |
| | 2-T | 315,001 | ZM | 14,006 |

The program is applicable to an overlap system requiring three operating cycles for each final execution of an instruction. For such a system the delay between the addressing of the transfer instruction and the time of addressing a new subset of instructions is two cycles, or $N = 2$. Therefore, $N-1 = 1$ and the special transfer instruction ENT of program step 4 is inserted before the last instruction YM of the subset constituted of steps 1-A through 4-A.

Such a program is of use where items of information previously entered into the Data Store are to be repositioned at other Data Store locations, which are associated with a particular subset forming a part of the program. A repositioning of this character makes it possible to simplify the structure of the processing equipment since the subset can then be designed to operate upon a restricted section of the Program Store.

The designation of each command is chosen to give an indication of the data processing operation directed by it. Thus, the designation MX indicates that data from the Data Store, or memory, are to be entered into the X Register; conversely, XM concerns the placing of X Register data in the Data Store. Since, in a three-cycle system, the transfer instruction provided by the invention allows the execution of the final instruction in a subset from which a transfer is to be made, its designation ENT is an abbreviation for "Execute Next (Instruction and then) Transfer".

Each step of the program contains the address of an instruction in the Program Store, as well as the instruction. For example, step 1 of the program contains the address 300,000 of the instruction MX14,000. The latter, in turn, consists of a prefix or command portion MX and a suffix or address portion 14,000 giving the location in the Data Store of data subject to the command. It is to be noted that all of the commands set forth in the Table involve transmission only to or from the Data Store. In general, the execution of certain commands may not involve the Data Store, in which case the commands are unaccompanied by data address portions.

Ordinarily, the instructions set forth in the Table would be included somewhere in the midst of a program. For simplicity, it will be assumed that the first instruction of the Table is associated with the first step of the program. Then, for the first cycle of operation, the program address at the output of the Program Address Register PAR is 300,000, as dictated by step 1 of the program. During this cycle, the Program Address Gate PAG is operated to ready the instruction MX14,000 at program address 300,000 for transmission to the Preliminary Register PR. For the initiating cycle there are no other program actions by the processing system. Typically, other program actions, as will be seen for subsequent cycles, take place concurrently with the addressing of the Program Store.

During the second cycle (step 2), the program address at the output of the Program Address Register is incremented by the action of the Increment Circuit, making the program address 300,001. Simultaneously, instruction MX14,000 enters the Preliminary Register as a result of the operation of the Program Register Gate PRG. Subsequently, during this cycle, the suffix portion 14,000 of the instruction in the Preliminary Register is made available to the Data Address Register through an Address Register Gate ARG. Ordinarily, the address in the Data Address Register, is preceded by a so-called index adder which modifies the suffix portion of an instruction. Such an index adder has been omitted since its inclusion would add complexity to the system without contributing to an explanation of the invention. While the suffix portion 14,000 of the instruction is entering the Data Address Register, the Preliminary Decoder responds to the prefix portion MX of the instruction and operates a Data Address Gate DAG, making the data address available to the Data Store.

During the third cycle (step 3), the program address advances to 300,002. At the same time, the prefix MX enters the Final Register by the operation of a Final Register Gate FRG. While the prefix MX is in the Final Register, the Final Decoder FID operates accordingly. Since the prefix MX indicates that data are to be "read" from the Data Store DS and sent to the X Register, the Final Decoder operates the Data Reading Gate DRG, the Buffer Register Output Gate BOG, and the X Register Input Gate XIG. As a result, there is a through path for the data from the Data Store to the X Register by way of the Buffer Data Register. In the meantime, the instruction MY14,001 enters the Preliminary Register.

Similar operations to those described above, except for operation of the Data Writing Gate DWG during "-writing" for prefix YM, take place during the ensuing cycles. During the fifth cycle (step 5) the instruction XM14,002 enters the Final Register and is executed in the manner previously described. Simultaneously the transfer instruction ENT315,000 arrives at the Preliminary Register. Unlike the other instructions, the address of the transfer instruction is not destined for the Data Store. Instead of operating either the Data Address Gate or the Increment Circuit Gate, the code associated with the transfer instruction acts upon the Transfer Address Gate TAG, causing the Transfer Address to substitute for the Program Address 300,005 that would otherwise appear at the output of the Program Address Register. Since the Increment Circuit does not operate, the Increment Circuit is prevented from interfering with the Transfer Address in the Program Address Register.

During the sixth cycle (step 6) the instruction YM14,003 enters the Preliminary Register and the transfer instruction advances to the Final Register, and the Program Store is addressed at location 315,000, so that on the seventh cycle the instruction entering the Preliminary Register is not that of program step 8 or instruction MZ14,004, but is instruction MZ14,005. The latter is the first instruction of a transferee subset and is not associated with a numbered step of the program since it ordinarily appears with a step of the program preceding that from which the transfer has been made.

Thus, the transfer is made without the loss of the operating time associated with the entry of the undesired instruction MZ14,004 into the Preliminary Instruction Register, as is normally the case where processing takes place on an overlap basis. Upon completed execution of the instructions in the transferee subset, a transfer can be effected to another transferee subset, or to step seven of the main program, using an intermediate transfer instruction similar to that included with the subset 1–A through 4–A.

In L. C. Schmierer et al. U.S. Pat. No. 3,058,658, granted Oct. 16, 1962, there is shown an overlap mode computer having a lock-in switch L which prevents the sequencing of the program by blocking an enabling signal on lead 21 for address register K until a transfer address is placed in register K by way of the AND 3 gate. To modify the Schmierer overlap mode computer so as to permit the practice of this invention, it is merely necessary to omit switch L entirely or to operate switch L immediately when a transfer instruction is decoded.

Numerous adaptations of the invention, along with other instrumentational settings, will occur to those skilled in the art.

What is claimed is:

1. Cyclically operating data processing apparatus comprising means for storing first and second subsets of instruction signals, the members of the first subset including transfer instruction signals, means for initiating, at substantially the beginning of each data processing cycle, the extraction of instruction signals from the storing means, a first register and a second register, first means for gating instruction signals, extracted from said storing means, to the first of the registers at substantially the beginning of each data processing cycle, second means for gating transfer instruction signals, extracted from said storing means, from said first register to said second register after the operation of the first-mentioned gating means, and third means for gating said transfer instruction signals from said second register to the initiating means at the time the last member of said first subset is being extracted from said storing means, whereby a transfer instruction preceding the last instruction of said first subset initiates the extraction of instruction signals of said second subset immediately following the extraction of the last instruction signals of said first subset.

2. Apparatus for cyclically operating on an overlap basis comprising storage means, means for addressing said storage means sequentially during a current machine cycle to extract signals therefrom during the next cycle, means for decoding during said current cycle, signals extracted during the previous cycle, and means responsive to the decoding means for establishing a nonsequential address in the addressing means during said next cycle.

3. In an overlap data processing apparatus for which a memory is being addressed for a first instruction at the same time a second instruction is being extracted therefrom and a third instruction is being executed, apparatus for facilitating a transfer from one subset of instructions to another which comprises means for executing all of the instructions of a first subset on an overlap basis, and means for initiating a transfer to a second subset of instructions during the extraction of at least one of the instructions of said first subset.

4. Program data processing apparatus for facilitating a transfer from one subset of instructions to another which comprises means for storing signals representing (1) the instructions of the subsets and (2) an instruction directing a transfer from one subset to another, means for extracting said signals from storage, and means extracting the transfer signals from storage before all the signals of said one subset are extracted and means producing a transfer to the signals of the other subset immediately following the execution of the last signals of said one subset.

5. Apparatus comprising storage means having a plurality of storage locations, means or extracting signals from a first set of sequential locations of said storage means, and means, responsive to an intermediate one of the extracted signals, for initiating a transfer before the last instruction of the first sequence is executed and completing said transfer immediately following the execution of said last instruction of the first sequence.

6. In programmed data processing, the method of facilitating a transfer from one subset of program instructions to another, which comprises the steps of 1. storing signals representing the instructions of the subsets,
2. storing signals, representing an instruction dictating a transfer from one subset to another,
3. commencing to extract from storage, and commencing to execute, said signals representing the instructions of the one subset,
4. extracting from storage, and executing, said signals representing the transfer instruction before executing the signals representing the last instruction of said one subset, and
5. executing the signals representing the last instruction of said one subset immediately followed by executing the signals of said other subset to which a transfer is made in accordance with said transfer instruction.

7. The method of processing data during synchronous machine cycles under the control of two subsets of instructions, which comprises the steps of 1. entering an instruction of a first subset into a first register,
2. entering said instruction into a second register during the same machine cycle that an instruction to transfer to a second subset is entered into said first register,
3. entering said transfer instructions into said second register from said first register during the same machine cycle that another instruction of said first subset is entered into said first register,
4. entering said other instruction into said second register from said first register during the same machine cycle that the first instruction dictated by a said transfer instruction is entered into said first register, thereby to facilitate the execution of an instruction for transferring from one subset of instructions to another.

8. The method of processing data under the control of instructions in a data processing system, which comprises the steps of 1. sequentially processing the instructions of a sequence of instructions, including an instruction for transferring to a nonsequential instruction of said machine,
2. executing a further instruction of said sequence, and
3. completing said transfer and executing said nonsequential instruction.

9. In a data processing system operating under the control of sequential instructions on an overlap basis during synchronous machine cycles, the method of facilitating a transfer from one subset of instructions to another, which comprises the steps of 1. initiating the execution of some, but not all, of the instructions of a first subset of instructions during successive machine cycles,
2. initiating, but not completing, a transfer to the first instruction of a second subset during the same machine cycle that an instruction of said first subset is being executed,
3. executing the remaining instructions of said first subset during successive machine cycles, and
4. executing the first instruction of said second subset, prescribed by said transfer, during the machine cycle immediately following the execution of the last instruction of said first subset.

10. In a data processing system operating cyclically under the control of instructions on an overlap basis for which one instruction is being addressed during the same machine cycle that another instruction is being decoded, the method of facilitating a transfer of system operation from one subset of instructions to another, which comprises the steps of 1. addressing a transfer instruction, for transferring from a first set of instructions to a second set of instructions, and decoding an instruction of said first subset of instructions during a first machine cycle,
2. addressing a succeeding instruction of said first subset of instructions and decoding said transfer instruction during a second machine cycle,
3. addressing the first instruction of said second subset of instructions, as dictated by said transfer instructions, and decoding said succeeding instruction of said first subset during a third machine cycle, and
4. addressing the second instruction of said second subset of instructions and decoding the first instruction of said second subset during a fourth machine cycle.

11. In programmed data processing, the method of facilitating a transfer from one set of program instructions to another, which comprises the steps of 1. storing the instructions of the one set in sequential locations of a store, and including an instruction for transferring from said one set to the other set at an intermediate location of said sequential locations,
2. storing the instructions of said other set in sequential locations, different from the first, of said store,
3. initiating the extraction of the instructions of said one set in sequence, and
4. processing the instructions thus extracted on an overlap basis for which one instruction is being at least partially executed at the same time the succeeding instruction is being extracted from said store, whereby an instruction of the one subset, to which a transfer is made in accordance with the transfer instruction, is extracted from said store at the same time the last instruction of the other subset is being executed.

12. In programmed data processing, the method of facilitating the transfer from one set of program instruction to another, which comprises the steps of 1. storing the instructions of the one set in sequential locations of a store and including an instruction for transferring from said one set to the other set at an intermediate location of said sequence,
2. storing the instructions of said other set in sequential locations, different from the first, of said store,
3. initiating the extraction of the instructions of said one set in sequence,
4. processing the instructions thus extracted on an overlap basis in which one instruction is at least partially extracted during the same machine cycle that the succeeding instruction is being extracted from said store, whereby the intermediate position of the transfer instruction permits the first instruction of said other set to be executed immediately following the execution of the last instruction of said one set.

* * * * *